(12) United States Patent
Xie et al.

(10) Patent No.: US 12,182,443 B2
(45) Date of Patent: Dec. 31, 2024

(54) DATA STORAGE METHOD AND APPARATUS, READABLE MEDIUM, AND ELECTRONIC DEVICE

(71) Applicant: Beijing Bytedance Network Technology Co., Ltd., Beijing (CN)

(72) Inventors: Yongji Xie, Beijing (CN); Qi Liu, Beijing (CN); Xiongchun Duan, Beijing (CN); Jiachen Zhang, Beijing (CN); Wen Chai, Beijing (CN); Yu Zhang, Beijing (CN); Jian Wang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/674,125

(22) Filed: May 24, 2024

(65) Prior Publication Data
US 2024/0311046 A1   Sep. 19, 2024

Related U.S. Application Data
(63) Continuation of application No. PCT/CN2022/132855, filed on Nov. 18, 2022.

(30) Foreign Application Priority Data
Nov. 25, 2021 (CO) .......................... 202111415845.3

(51) Int. Cl.
*G06F 3/06* (2006.01)
(52) U.S. Cl.
CPC .......... *G06F 3/0656* (2013.01); *G06F 3/0604* (2013.01); *G06F 3/0664* (2013.01); *G06F 3/067* (2013.01)

(58) Field of Classification Search
CPC ...... G06F 3/0656; G06F 3/067; G06F 3/0604; G06F 3/0664
See application file for complete search history.

(56) References Cited

U.S. PATENT DOCUMENTS

| 2004/0143718 A1 | 7/2004 | Chen et al. |
| 2005/0273571 A1 | 12/2005 | Lyon et al. |
| (Continued) | | |

FOREIGN PATENT DOCUMENTS

| CN | 1540524 A | 10/2004 |
| CN | 1655129 A | 8/2005 |
| (Continued) | | |

OTHER PUBLICATIONS

Ahmed et al., "Docker Container Deployment in Distributed Fog Infrastructures with Checkpoint/Restart", IEEE, Feb. 10, 2020, pp. 1-8.

(Continued)

*Primary Examiner* — Mark A Giardino, Jr.
(74) *Attorney, Agent, or Firm* — Faegre Drinker Biddle & Reath LLP

(57) ABSTRACT

The present disclosure relates to a data storage method and apparatus, a non-transitory computer-readable medium, and an electronic device. In the method, when data to be stored that is sent by a container is received through a target interface, a first buffer is generated in storage space of a kernel, and a target length, in the first buffer, of the data to be stored and a start address, in the first buffer, of the data to be stored are obtained. A target physical address in the kernel corresponding to the data to be stored is determined based on the target length and the start address. The target physical address is mapped to a target virtual address in a storage service module.

20 Claims, 7 Drawing Sheets

(56) References Cited

U.S. PATENT DOCUMENTS

| | | | |
|---|---|---|---|
| 2009/0320042 | A1 | 12/2009 | Thelen et al. |
| 2018/0052776 | A1 | 2/2018 | Zhao et al. |
| 2018/0188990 | A1* | 7/2018 | Zhao .................. G06F 3/067 |
| 2018/0329828 | A1* | 11/2018 | Apfelbaum ......... G06F 12/1009 |
| 2019/0373521 | A1 | 12/2019 | Crawford |
| 2023/0205505 | A1* | 6/2023 | Chen .................. G06F 9/455 |
| | | | 717/174 |

FOREIGN PATENT DOCUMENTS

| | | | |
|---|---|---|---|
| CN | 105138481 | A | 12/2015 |
| CN | 107577418 | A | 1/2018 |
| CN | 108304269 | A | 7/2018 |
| CN | 109558211 | A | 4/2019 |
| CN | 109977037 | A | 7/2019 |
| CN | 111290826 | A | 6/2020 |
| CN | 111723024 | A | 9/2020 |
| CN | 113407296 | A | 9/2021 |
| CN | 114089920 | A | 2/2022 |
| CN | 107918555 | A | 4/2024 |
| CN | 114089920 | B | 8/2024 |
| WO | 2019/244670 | A1 | 12/2019 |

OTHER PUBLICATIONS

International Search Report and Written Opinion received for PCT Patent Application No. PCT/CN2022/132855, mailed on Feb. 8, 2023, 6 pages (3 pages of English Translation and 3 pages of Original Document).

Office action received from Chinese patent application No. 202111415845.3 mailed on Nov. 30, 2023, 13 pages (5 pages English Translation and 8 pages Original Copy).

* cited by examiner

DATA STORAGE METHOD AND APPARATUS, READABLE MEDIUM, AND ELECTRONIC DEVICE

CROSS-REFERENCE TO RELATED APPLICATION

This application is a continuation of International Application No. PCT/CN2022/132855 filed on Nov. 18, 2022, which claims the priority to and benefits of Chinese Patent Application No. 202111415845.3, filed on Nov. 25, 2021. All the aforementioned patent applications are hereby incorporated by reference in their entireties.

TECHNICAL FIELD

The present disclosure relates to the field of computer technologies, and specifically, to a data storage method and apparatus, a non-transitory computer-readable medium, and an electronic device.

BACKGROUND

With the trend of cloud-native technologies, a container is widely used as their most important carrier of computing resources. In a compute-storage separation architecture, in order for the container to implement distributed storage, data to be stored usually needs to be transmitted through a kernel to a user process that provides a storage service. However, in the related art, a process in which the container accesses, through the kernel, the user process that provides the storage service to implement distributed storage usually has problems of great difficulty in development, high memory consumption, and low data transmission efficiency.

SUMMARY

This section is provided to give a brief overview of concepts, which will be described in detail later in the section Detailed Description of Embodiments. This section is neither intended to identify key or necessary features of the claimed technical solutions, nor is it intended to be used to limit the scope of the claimed technical solutions.

The present disclosure provides a data storage method and apparatus, a non-transitory computer-readable medium, and an electronic device.

According to a first aspect, the present disclosure provides a data storage method, applied to a distributed storage system. The distributed storage system includes a container, a kernel, and a user-mode storage service module. The storage service module is configured to provide a storage service for the container. The method includes:
 when data to be stored that is sent by the container is received through a target interface, generating a first buffer in storage space of the kernel, and storing in the first buffer the data to be stored;
 obtaining a target length, in the first buffer, of the data to be stored and a start address, in the first buffer, of the data to be stored;
 determining, based on the target length and the start address, a target physical address in the kernel corresponding to the data to be stored, and generating a target page table based on the target physical address and a target virtual address in the storage service module, where the target page table includes a mapping relationship between the target physical address and the target virtual address; and
 transmitting the data to be stored to the storage service module based on the target virtual address and the target length.

According to a second aspect, the present disclosure provides a data storage apparatus, applied to a distributed storage system. The distributed storage system includes a container, a kernel, and a user-mode storage service module. The storage service module is configured to provide a storage service for the container. The apparatus includes:
 a first receiving module configured to: when data to be stored that is sent by the container is received through a target interface, generate a first buffer in storage space of the kernel, and store in the first buffer the data to be stored;
 a first obtaining module configured to obtain a target length, in the first buffer, of the data to be stored and a start address, in the first buffer, of the data to be stored;
 a first determining module configured to determine, based on the target length and the start address, a target physical address in the kernel corresponding to the data to be stored, and generate a target page table based on the target physical address and a target virtual address in the storage service module, where the target page table includes a mapping relationship between the target physical address and the target virtual address; and
 a transmission module configured to transmit the data to be stored to the storage service module based on the target virtual address and the target length.

According to a third aspect, the present disclosure provides a non-transitory computer-readable medium having a computer program stored thereon. When the program is executed by a processing apparatus, the steps of the method according to the first aspect are implemented.

According to a fourth aspect, the present disclosure provides an electronic device, including:
 a storage apparatus having one or more computer programs stored thereon; and
 one or more processing apparatuses configured to execute the one or more computer programs in the storage apparatus to implement the steps of the method according to the first aspect.

The other features and advantages of the present disclosure will be described in detail in the following section Detailed Description of Embodiments.

BRIEF DESCRIPTION OF DRAWINGS

The above and other features, advantages, and aspects of embodiments of the present disclosure become more apparent with reference to the following specific implementations and in conjunction with the accompanying drawings. Throughout the accompanying drawings, the same or similar reference numerals denote the same or similar elements. It should be understood that the accompanying drawings are schematic and that parts and elements are not necessarily drawn to scale. In the accompanying drawings.

DETAILED DESCRIPTION

Embodiments of the present disclosure are described in more detail below with reference to the accompanying drawings. Although some embodiments of the present disclosure are shown in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and the embodiments of the present disclosure are only for exemplary purposes, and are not intended to limit the scope of protection of the present disclosure.

It should be understood that the various steps described in the method implementations of the present disclosure may be performed in different orders, and/or performed in parallel. Furthermore, additional steps may be included and/or the execution of the illustrated steps may be omitted in the method implementations. The scope of the present disclosure is not limited in this respect.

The term "include/comprise" used herein and the variations thereof are an open-ended inclusion, namely, "include/comprise but not limited to". The term "based on" is "at least partially based on". The term "an embodiment" means "at least one embodiment". The term "another embodiment" means "at least one another embodiment". The term "some embodiments" means "at least some embodiments". Related definitions of the other terms will be given in the description below.

It should be noted that concepts such as "first" and "second" mentioned in the present disclosure are only used to distinguish between different apparatuses, modules, or units, and are not used to limit the sequence or interdependence of functions performed by these apparatuses, modules, or units.

It should be noted that the modifiers "one" and "a plurality of" mentioned in the present disclosure are illustrative and not restrictive, and those skilled in the art should understand that unless the context clearly indicates otherwise, the modifiers should be understood as "one or more".

The names of messages or information exchanged between a plurality of apparatuses in the implementations of the present disclosure are used for illustrative purposes only, and are not used to limit the scope of these messages or information.

Figure 1:
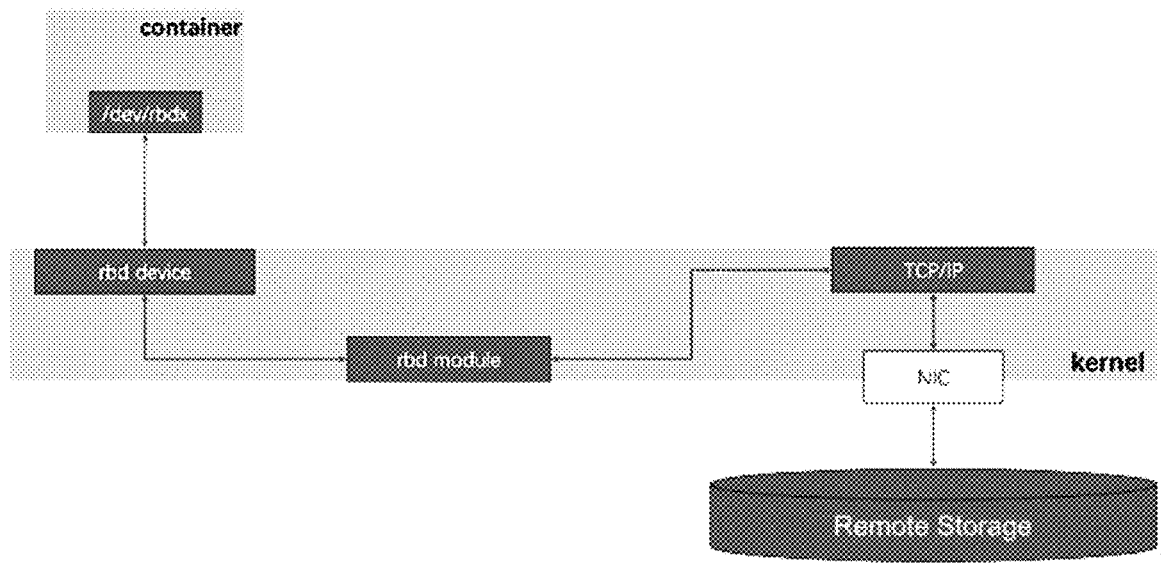
FIG. 1 is a schematic diagram of a distributed storage system according to an exemplary embodiment of the present disclosure.
Figure 2:
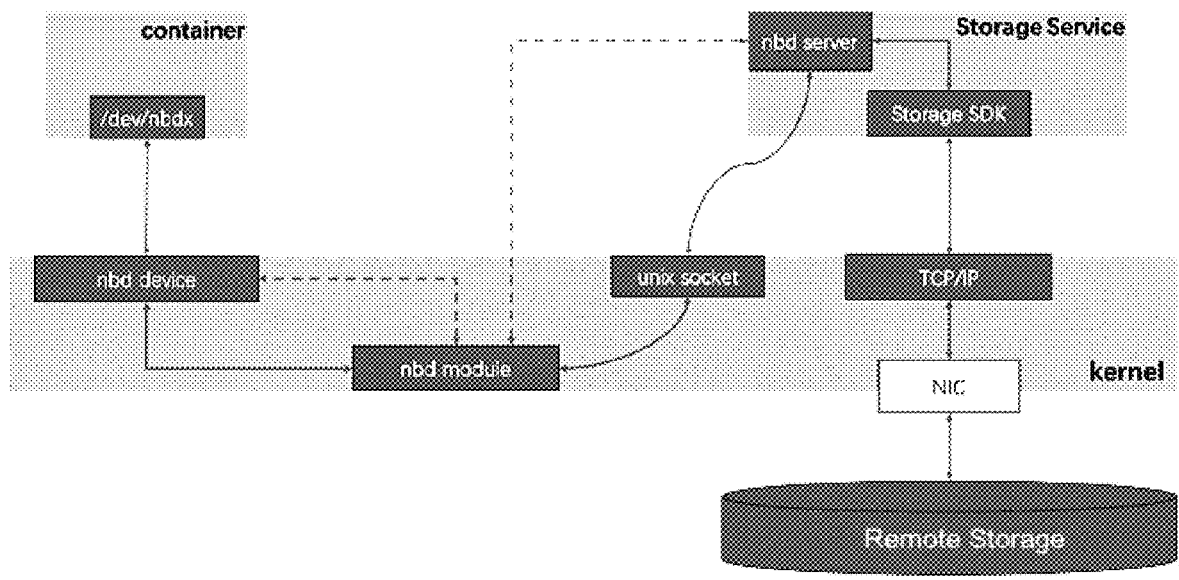
FIG. 2 is a schematic diagram of another distributed storage system according to an exemplary embodiment of the present disclosure.

Before specific implementations of the present disclosure are described in detail, an application scenario of the present disclosure is first described as follows. The present disclosure may be applied to a process of developing a distributed storage system for a container. The distributed storage system is configured for separation of compute and storage. For example, computing is performed in the container, and storage is provided by a user process that provides a storage service. The user process that provides the storage service may locally store data to be stored, or may send data to be stored through a network to another device for storage. In a distributed storage system in the related art, when the container accesses the user process that provides the distributed storage service, an access mode shown in FIG. 1 or FIG. 2 is usually used (FIG. 1 and FIG. 2 are schematic diagrams of a distributed storage system according to an exemplary embodiment of the present disclosure). In FIG. 1, an nbd module of a kernel provides a virtual nbd disk for the container to use, access of the container to the nbd disk may be forwarded to the user process (that is, a user-mode daemon) through a unix socket, and then the user-mode daemon sends data to be stored through the network to a distributed storage backend. The access mode shown in FIG. 1 has a problem that there may be a plurality of copies and system calls in a process in which the user-mode daemon receives and sends data to be stored from an nbd client of the kernel through the unix socket, causing low data transmission efficiency and affecting performance of the kernel. A method shown in FIG. 2 is implemented by a dedicated kernel module, for example, an rbd module of ceph. The kernel module simulates a virtual disk rbd for the container to access. In addition, the kernel module forwards an access request of the container for the virtual disk to a storage service module through the network. In the access mode shown in FIG. 2, because distributed logic needs to be processed in the kernel module, there is great difficulty in development, and operability and maintainability are poor, which is not conducive to improvement of program development efficiency. In other words, in the related art, development of the distributed storage system for the container usually has the problems of high difficulty in development and low development efficiency, and the developed distributed storage system also has the problems of poor operability and maintainability, high memory consumption, low data transmission efficiency, and the like.

To solve the above technical problems, the present disclosure provides a data storage method and apparatus, a non-transitory computer-readable medium, and an electronic device. In the method, when data to be stored that is sent by a container is received through a target interface, a first buffer is generated in storage space of a kernel, and the data to be stored is stored in the first buffer. A target length, in the first buffer, of the data to be stored and a start address, in the first buffer, of the data to be stored are obtained. A target physical address in the kernel corresponding to the data to be stored is determined based on the target length and the start address. The target physical address in the kernel corresponding to the data to be stored is mapped to a target virtual address in a storage service module, so that the storage service module can jump to the target physical address in the kernel when accessing the target virtual address, to read, from the kernel, the data to be stored that is output by the container. In this way, distributed storage of the data output by the container is implemented. This can reduce the difficulty in developing a distributed storage system, improve the efficiency of developing the distributed storage system, and reduce the memory consumption in a distributed storage process of data while effectively ensuring the data transmission efficiency.

The following describes implementations of the present disclosure in detail with reference to specific embodiments.

Figure 3:
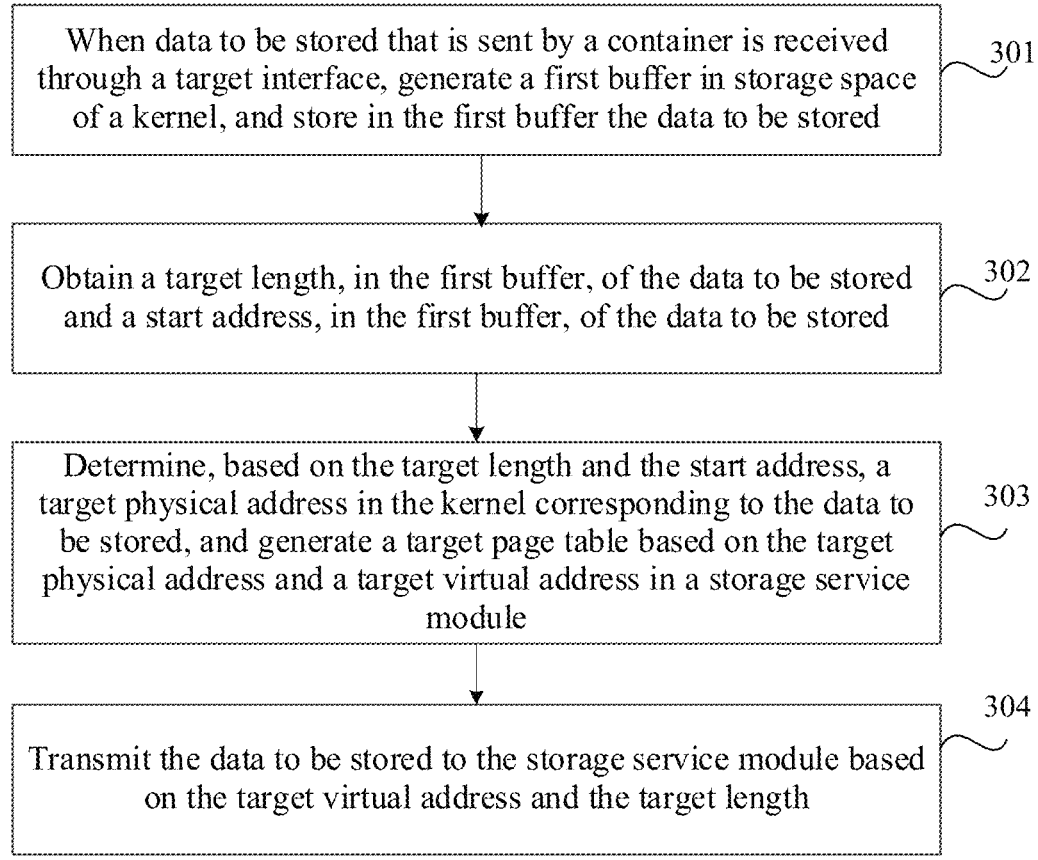
FIG. 3 is a flowchart of a data storage method according to an exemplary embodiment of the present disclosure.

FIG. 3 is a flowchart of a data storage method according to an exemplary embodiment of the present disclosure. As shown in FIG. 3, the data storage method is applied to a distributed storage system. The distributed storage system includes a container, a kernel, and a user-mode storage service module. The storage service module is configured to provide a storage service for the container. The method may include the following steps.

Step 301: When data to be stored that is sent by the container is received through a target interface, generate a first buffer in storage space of the kernel, and store in the first buffer the data to be stored.

The first buffer may include one or more hashed buffers in a memory of the kernel.

In this step, the target interface may be created in the following manners.

In a first manner, a virtio-blk device driver is preset in the kernel. The kernel receives a virtio-blk virtual device creation instruction sent by the storage service module, where the virtio-blk virtual device creation instruction includes a target device parameter required for creating a virtio-blk virtual device. The virtio-blk virtual device is generated based on the target device parameter. When it is determined that there is the virtio-blk virtual device in the kernel, the virtio-blk device driver is executed in response to receiving a block device program creation instruction sent by the storage service module, to generate a virtual block device program, where the virtual block device program includes the target interface exposed to the container.

Figure 4:
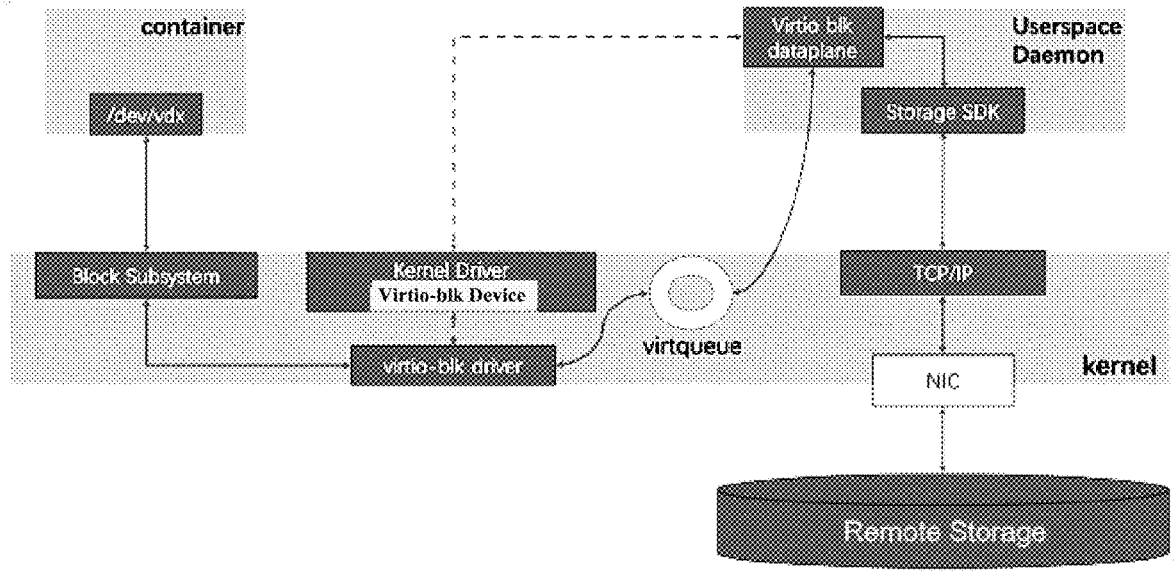
FIG. 4 is a schematic diagram of still another distributed storage system according to an exemplary embodiment of the present disclosure.

For example, FIG. 4 is a schematic diagram of still another distributed storage system according to an exemplary embodiment of the present disclosure. As shown in FIG. 4, the target interface may be/dev/vdx exposed by a block subsystem (virtual block device program) to the container. The target device parameter may include a size, a block size, a number of I/O queues, a queue depth, and the like.

In a second manner, an interface of a shared file system may be generated by a virtio-fs method in the related art, and the interface of the shared file system is used as the target interface. It should be noted that for a specific implementation process of generating the interface of the shared file system by the virtio-fs method, reference may be made to related descriptions in the related art, and this part is common in the related art and is not described in the present disclosure again.

Step 302: Obtain a target length, in the first buffer, of the data to be stored and a start address, in the first buffer, of the data to be stored.

It should be noted that when the first buffer includes a plurality of hashed buffers, a length, in each hashed buffer, of data to be stored and a start address, in each hashed buffer, of the data to be stored may be obtained.

Step 303: Determine, based on the target length and the start address, a target physical address in the kernel corresponding to the data to be stored, and generate a target page table based on the target physical address and a target virtual address in the storage service module.

The target page table includes a mapping relationship between the target physical address and the target virtual address.

It should be noted that when the first buffer includes the plurality of hashed buffers, the target physical address includes a physical address corresponding to each hashed buffer, and the target virtual address includes a segment of virtual address corresponding to the physical address corresponding to each hashed buffer.

Step 304: Transmit the data to be stored to the storage service module based on the target virtual address and the target length.

In this step, a target descriptor is generated based on the target virtual address and the target length, and the target descriptor is delivered to the storage service module through a virtqueue mechanism based on the target descriptor, so that the storage service module obtains, through the target descriptor, the data to be stored, and performs a storage operation on the data to be stored. Alternatively, the storage service module may be caused by another method in the related art to access the target virtual address, so that the storage service module jumps to the target physical address in the kernel when accessing the target virtual address, to read, from the kernel, the data to be stored that is output by the container.

It should be noted that when the storage service module obtains the target virtual address through the target descriptor, target virtual address space may be converted into corresponding target physical address space through a hardware input/output translation lookaside buffer (IOTLB), so that a target descriptor including the target virtual address may be generated, and the target physical address (PA) is no more recorded. In other words, the target physical address is replaced with the target virtual address (for example, an I/O virtual address (IOVA), allocated by an IOMMU driver), so that when the storage service module accesses the target virtual address in the target descriptor, the target virtual address is converted into the target physical address with the assistance of the hardware IOTLB, to obtain the data to be stored that is stored at the target physical address.

According to the above technical solution, the target physical address in the kernel corresponding to the data to be stored is mapped to the target virtual address in the storage service module, so that the storage service module can jump to the target physical address in the kernel when accessing the target virtual address, to read, from the kernel, the data to be stored that is output by the container. In this way, distributed storage of the data output by the container is implemented. This can reduce the difficulty in developing the distributed storage system, improve the efficiency of developing the distributed storage system, and reduce the memory consumption in a distributed storage process of data while effectively ensuring the data transmission efficiency.

Figure 5:
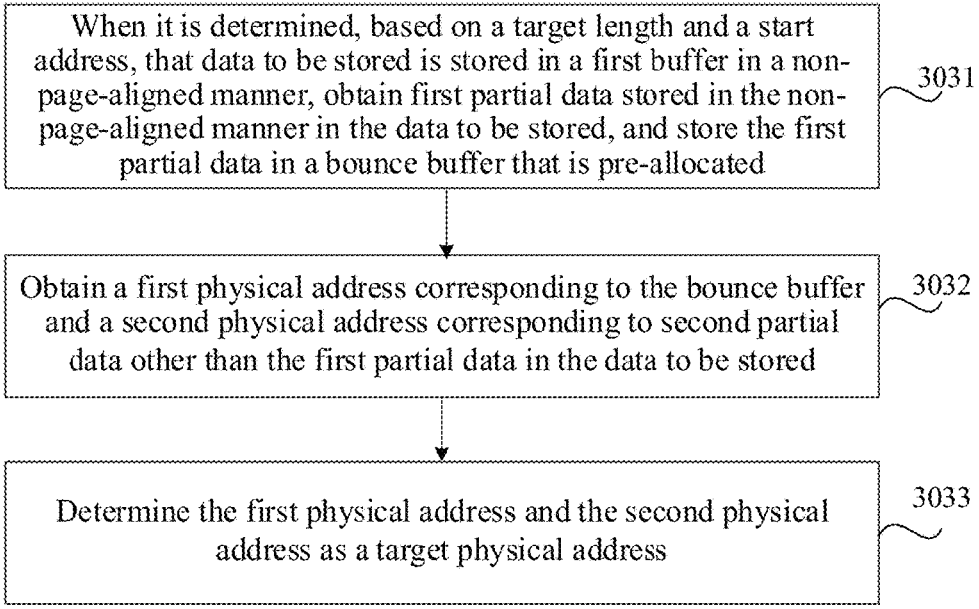
FIG. 5 is a flowchart of a data storage method according to the embodiment shown in FIG. 3 of the present disclosure.

In some embodiments, FIG. 5 is a flowchart of a data storage method according to the embodiment shown in FIG. 3 of the present disclosure. As shown in FIG. 5, determining, based on the target length and the start address, the target physical address in the kernel corresponding to the data to be stored in step 303 in FIG. 3 may include the following steps.

Step 3031: When it is determined, based on the target length and the start address, that the data to be stored is stored in the first buffer in a non-page-aligned manner, obtain first partial data stored in the non-page-aligned manner in the data to be stored, and store the first partial data in a bounce buffer that is pre-allocated.

In this step, an implementation of determining, based on the target length and the start address, that the data to be stored is stored in the first buffer in the non-page-aligned manner may be as follows:

obtaining a first ratio of the target length to a page size; and when the first ratio is an integer, determining a second ratio of the start address to the page size, and if the second ratio is an integer, determining that the data to be stored is stored in the first buffer in a page-aligned manner, or if the second ratio is not an integer, determining that the data to be stored is stored in the first buffer in the non-page-aligned manner; or when the first ratio is not an integer, determining that the data to be stored is stored in the first buffer in the non-page-aligned manner.

For example, the first buffer includes two hashed buffers, where a target length corresponding to data to be stored that is stored in a 1st buffer is 7K, and a target length corresponding to data to be stored that is stored in a 2nd buffer is 8K. The page size (that is, a size of data stored on an entire page) is 4K. Since 7/4 is not an integer, which indicates that a part of data in the 1st buffer in the first buffer is not aligned to the entire page, the 1st buffer is stored in the non-page-aligned manner. A ratio of the target length corresponding to the 2nd buffer to the page size is 8/4, which is an integer. If a start address corresponding to the data to be stored in the 2nd buffer is an integral multiple of 4, it is determined that the data to be stored in the 2nd buffer starts from an initial address of the entire page and ends at an end address of the entire page, and therefore the data is stored in the page-aligned manner; or if a start address corresponding to the data to be stored in the 2nd buffer is not an integral multiple of 4, it indicates that the data to be stored in the 2nd buffer is stored from a middle position of the entire page (for example, if 4K is stored on the entire page, the data to be stored is stored from the 2Kth), and therefore the data is stored in the non-page-aligned manner. For the 1st buffer, since the last 4K may form an entire page, the first 3K of the data to be stored may be obtained, the first 3K is used as the first partial data, and the first partial data is stored in the bounce buffer that is pre-allocated. For the 2nd buffer, when the start address is not an integral multiple of 4, the first partial data stored in the non-page-aligned manner may be obtained based on the start address. For example, the start address is the 2Kth. In this case, the first 2K and the last 2K of the data to be stored may be obtained as the first partial data, and the first partial data is copied to the bounce buffer.

Step 3032: Obtain a first physical address corresponding to the bounce buffer and a second physical address corresponding to second partial data other than the first partial data in the data to be stored.

Step 3033: Determine the first physical address and the second physical address as the target physical address.

According to the above technical solution, a non-page-aligned part is stored in the bounce buffer, so that other data other than the data to be stored in the kernel can be effectively prevented from being leaked to the storage service module, security of the other data in the kernel can be effectively ensured, and impact on normal operation of another system in the kernel can be avoided.

Figure 6:
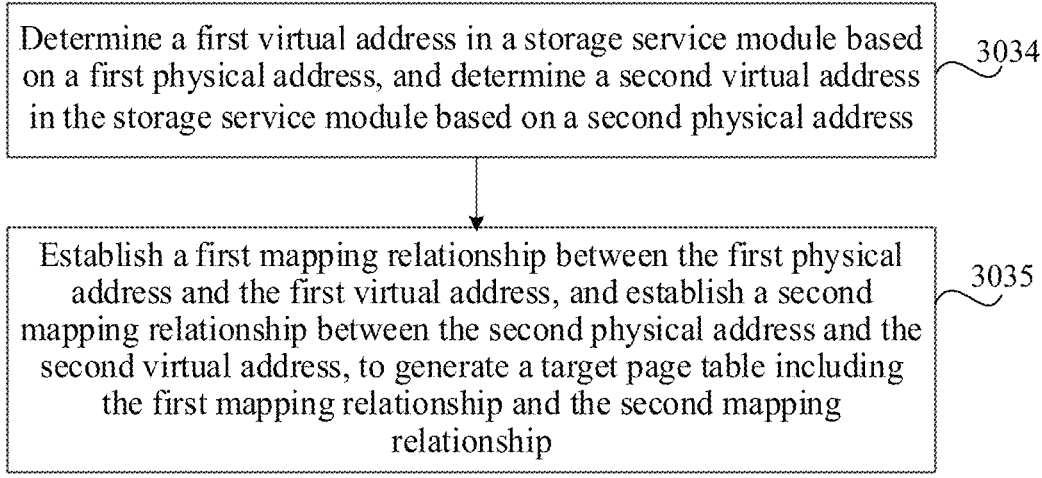
FIG. 6 is a flowchart of a data storage method according to the embodiment shown in FIG. 5 of the present disclosure.

Further, FIG. 6 is a flowchart of a data storage method according to the embodiment shown in FIG. 5 of the present disclosure. When it is determined, based on the target length and the start address, that the data to be stored is stored in the first buffer in the non-page-aligned manner, generating the target page table based on the target physical address and the target virtual address in the storage service module in step 303 in FIG. 3 may include the following steps, as shown in FIG. 6.

Step 3034: Determine a first virtual address in the storage service module based on the first physical address, and determine a second virtual address in the storage service module based on the second physical address.

In this step, a virtual address of a corresponding length may be determined as the first virtual address in the storage service module based on a length of stored data corresponding to the first physical address. Similarly, the second virtual address may be determined based on the second physical address.

Step 3035: Establish a first mapping relationship between the first physical address and the first virtual address, and establish a second mapping relationship between the second physical address and the second virtual address, to generate a target page table including the first mapping relationship and the second mapping relationship.

According to the above technical solution, the first physical address is mapped to the first virtual address in the storage service module, and the second physical address is mapped to the second virtual address in the storage service module, so that a reliable data basis is provided for the storage service module to access the target physical address through the target virtual address.

In some embodiments, when it is determined, based on the target length and the start address, that the data to be stored is stored in the first buffer in the page-aligned manner, an implementation of determining, based on the target length and the start address, the target physical address in the kernel corresponding to the data to be stored, and generating the target page table based on the target physical address and the target virtual address in the storage service module in step 303 in FIG. 3 may be as follows:

determining, based on the start address and the target length, a third physical address in the first buffer corresponding to the data to be stored, establishing a third mapping relationship between the third physical address and a third virtual address in the storage service module, and generating a target page table including the third mapping relationship.

Figure 7:
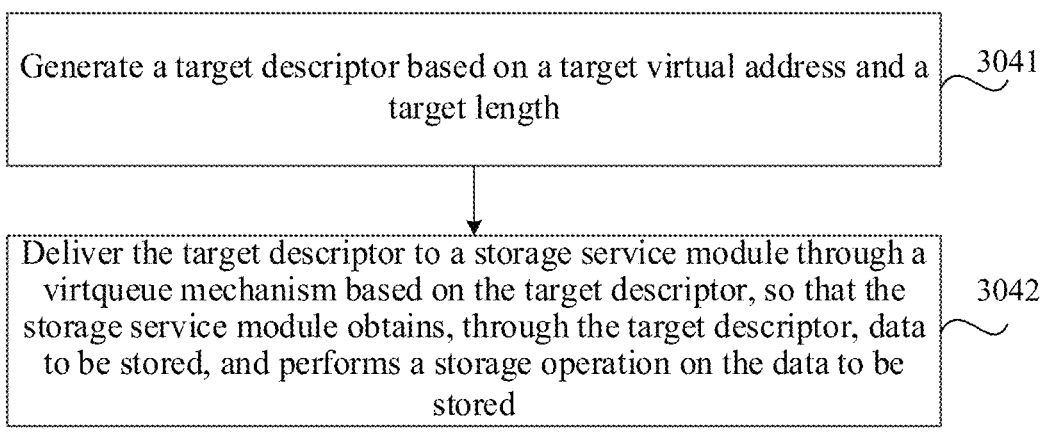
FIG. 7 is a flowchart of another data storage method according to the embodiment shown in FIG. 3 of the present disclosure.

In some embodiments, transmitting the data to be stored to the storage service module based on the target virtual address and the target length in step 304 in FIG. 3 may include the following steps, as shown in FIG. 7. FIG. 7 is a flowchart of another data storage method according to the embodiment shown in FIG. 3 of the present disclosure.

Step 3041: Generate a target descriptor based on the target virtual address and the target length.

In this step, when it is determined, based on the target length and the start address, that the data to be stored is stored in the first buffer in the non-page-aligned manner, a first length of the first partial data and a second length of the second partial data may be obtained. A target descriptor including the first virtual address, the first length, the second virtual address, and the second length is generated.

In addition, when it is determined, based on the target length and the start address, that the data to be stored is stored in the first buffer in the page-aligned manner, a target descriptor including the third virtual address and the target length is generated.

It should be noted that for an implementation of generating the target descriptor including the first virtual address, the first length, the second virtual address, and the second length, reference may be made to specific implementation details about generation of a transmission descriptor in the related art. For example, reference may be made to a generation process of obtaining a transmission descriptor in a direct memory access (DMA) mechanism. This part is mature in the related art and is not described in the present disclosure again.

Step 3042: Deliver the target descriptor to the storage service module based on the target descriptor through the virtqueue mechanism, so that the storage service module obtains, through the target descriptor, the data to be stored, and performs the storage operation on the data to be stored.

Figure 8:
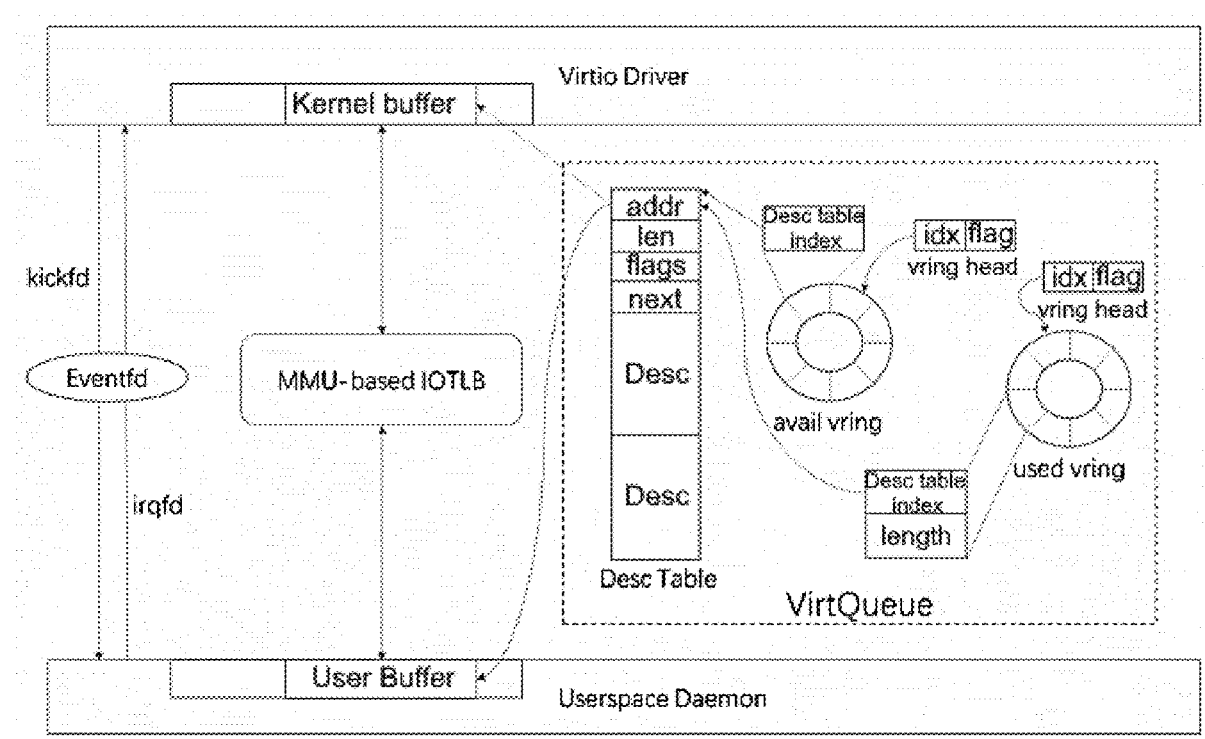
FIG. 8 is a schematic diagram of a virtqueue mechanism according to an exemplary embodiment of the present disclosure.

For example, FIG. 8 is a schematic diagram of a virtqueue mechanism according to an exemplary embodiment of the present disclosure. As shown in FIG. 8, the virtqueue mechanism includes a descriptor table, an avail ring, and a used ring. The storage service module may include a virtio backend shown in FIG. 8. The target descriptor is written into the descriptor table. A first index that corresponds to the target descriptor and that is in the descriptor table is written into the avail ring. The storage service module (virtio backend) is notified, so that the storage service module obtains the target virtual address through the first index, obtains the target physical address corresponding to the target virtual address through the target page table, obtains, through the target physical address, the data to be stored, and stores the data to be stored. The first index is written into the used ring. In this way, one transmission of the data to be stored is completed. An interrupt is injected through an eventfd mechanism, to trigger a virtio-blk driver, to enter a next transmission process of data to be transmitted.

In addition, when the storage service module obtains the target virtual address through the target descriptor, the target virtual address space may be converted into the corresponding target physical address space through the hardware input/output translation lookaside buffer (IOTLB) in an MMU-based IOTLB mechanism, so that the target descriptor including the target virtual address may be generated, and the target physical address (PA) is no more recorded. In other words, the target physical address is replaced with the target virtual address (for example, the I/O virtual address (IOVA), allocated by the IOMMU driver), so that when the storage service module accesses the target virtual address in the target descriptor, the target virtual address is converted into the target physical address with the assistance of the hardware IOTLB, to obtain the data to be stored that is stored at the target physical address.

According to the above technical solution, the target physical address in the kernel corresponding to the data to be stored is mapped to the target virtual address in the storage service module, so that the storage service module can jump to the target physical address in the kernel when accessing the target virtual address, to read, from the kernel, the data to be stored that is output by the container. In this way, distributed storage of the data output by the container is implemented. This can reduce the difficulty in developing the distributed storage system, improve the efficiency of developing the distributed storage system, and reduce the memory consumption in the distributed storage process of data while effectively ensuring the data transmission efficiency.

Figure 9:
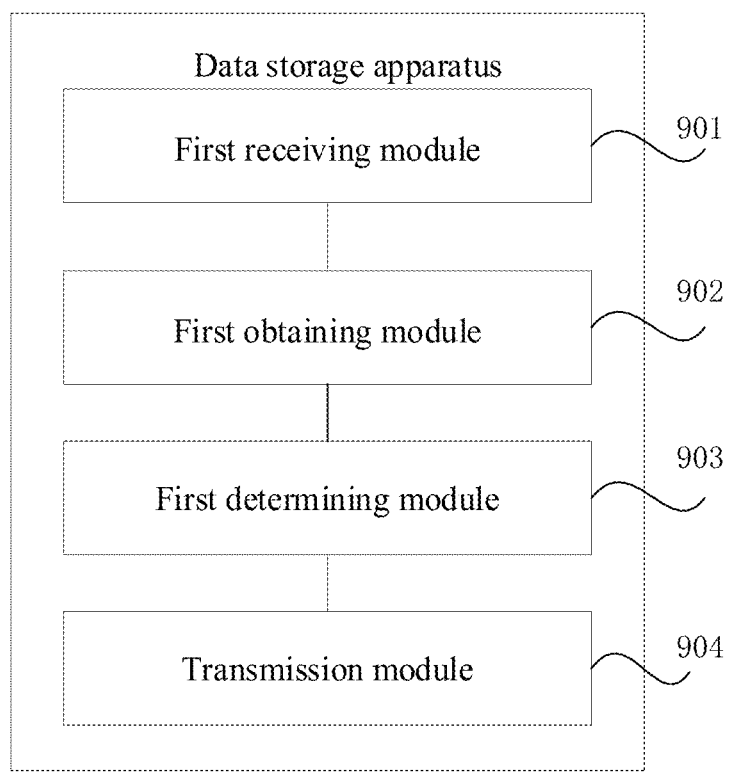
FIG. 9 is a block diagram of a data storage apparatus according to an exemplary embodiment of the present disclosure.

FIG. 9 is a block diagram of a data storage apparatus according to an exemplary embodiment of the present disclosure. Referring to FIG. 9, the data storage apparatus is applied to a distributed storage system. The distributed storage system includes a container, a kernel, and a user-mode storage service module. The storage service module is configured to provide a storage service for the container. The apparatus may include:

a first receiving module 901 configured to: when data to be stored that is sent by the container is received through a target interface, generate a first buffer in storage space of the kernel, and store in the first buffer the data to be stored;

a first obtaining module 902 configured to obtain a target length, in the first buffer, of the data to be stored and a start address, in the first buffer, of the data to be stored;

a first determining module 903 configured to determine, based on the target length and the start address, a target physical address in the kernel corresponding to the data to be stored, and generate a target page table based on the target physical address and a target virtual address in the storage service module, where the target page table includes a mapping relationship between the target physical address and the target virtual address; and a transmission module 904 configured to transmit the data to be stored to the storage service module based on the target virtual address and the target length.

According to the above technical solution, the target physical address in the kernel corresponding to the data to be stored is mapped to the target virtual address in the storage service module, so that the storage service module can jump to the target physical address in the kernel when accessing the target virtual address, to read, from the kernel, the data to be stored that is output by the container. In this way, distributed storage of the data output by the container is implemented. This can reduce the difficulty in developing the distributed storage system, improve the efficiency of developing the distributed storage system, and reduce the memory consumption in a distributed storage process of data while effectively ensuring the data transmission efficiency.

In some embodiments, the transmission module 904 is configured to:

generate a target descriptor based on the target virtual address and the target length; and deliver the target descriptor to the storage service module based on the target descriptor through a virtqueue mechanism, so that the storage service module obtains, through the target descriptor, the data to be stored, and performs a storage operation on the data to be stored.

In some embodiments, the first determining module 903 is configured to:

when it is determined, based on the target length and the start address, that the data to be stored is stored in the first buffer in a non-page-aligned manner, obtain first partial data stored in the non-page-aligned manner in the data to be stored, and store the first partial data in a bounce buffer that is pre-allocated;

obtain a first physical address corresponding to the bounce buffer and a second physical address corresponding to second partial data other than the first partial data in the data to be stored; and determine the first physical address and the second physical address as the target physical address.

In some embodiments, the first determining module 903 is configured to:

determine a first virtual address in the storage service module based on the first physical address, and determine a second virtual address in the storage service module based on the second physical address; and establish a first mapping relationship between the first physical address and the first virtual address, and establish a second mapping relationship between the second physical address and the second virtual address, to generate a target page table including the first mapping relationship and the second mapping relationship.

In some embodiments, the transmission module 904 is configured to:

when it is determined, based on the target length and the start address, that the data to be stored is stored in the first buffer in the non-page-aligned manner, obtain a first length of the first partial data and a second length of the second partial data; and generate a target descriptor including the first virtual address, the first length, the second virtual address, and the second length.

According to the above technical solution, a non-page-aligned part is stored in the bounce buffer, so that other data other than the data to be stored in the kernel can be effectively prevented from being leaked to the storage service module, security of the other data in the kernel can be effectively ensured, and impact on normal operation of another system in the kernel can be avoided.

Figure 10:
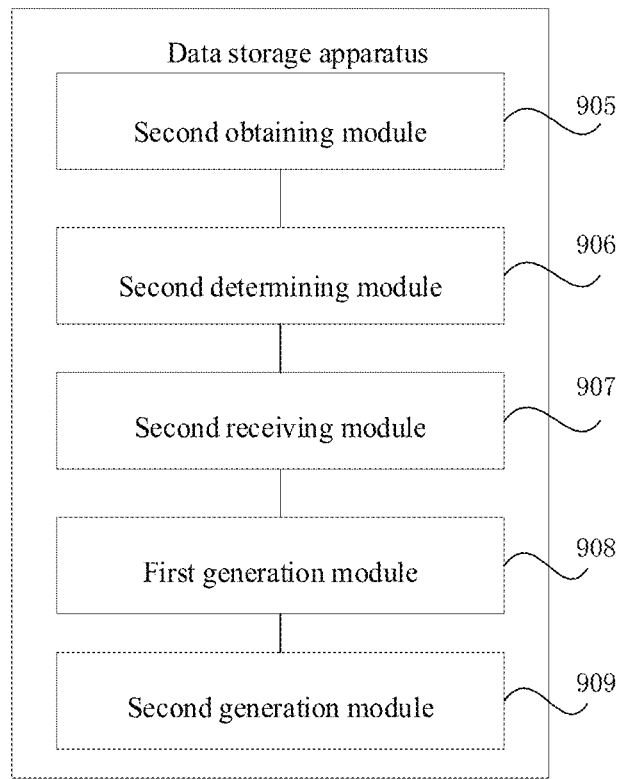
FIG. 10 is a block diagram of a data storage apparatus according to the embodiment shown in FIG. 9 of the present disclosure.

In some embodiments, FIG. 10 is a block diagram of a data storage apparatus according to the embodiment shown in FIG. 9 of the present disclosure. Referring to FIG. 10, the apparatus may further include:

a second obtaining module 905 configured to obtain a first ratio of the target length to a page size; and a second determining module 906 configured to: when the first ratio is an integer, determine a second ratio of the start address to the page size, and if the second ratio is not an integer, determine that the data to be stored is stored in the first buffer in the non-page-aligned manner.

The second determining module 906 is further configured to: when the first ratio is not an integer, determine that the data to be stored is stored in the first buffer in the non-page-aligned manner.

In some embodiments, the kernel includes a virtio-blk device driver. Before the data to be stored that is sent by the container is received through the target interface, the apparatus further includes:

a second receiving module 907 configured to receive a virtio-blk virtual device creation instruction sent by the storage service module, where the virtio-blk virtual device creation instruction includes a target device parameter required for creating a virtio-blk virtual device;

a first generation module 908 configured to generate the virtio-blk virtual device based on the target device parameter; and a second generation module 909 configured to: when it is determined that there is the virtio-blk virtual device in the kernel, execute the virtio-blk device driver in response to receiving a block device program creation instruction sent by the storage service module, to generate a virtual block device program, where the virtual block device program includes the target interface exposed to the container.

According to the above technical solution, the target physical address in the kernel corresponding to the data to be stored is mapped to the target virtual address in the storage service module, so that the storage service module can jump to the target physical address in the kernel when accessing the target virtual address, to read, from the kernel, the data to be stored that is output by the container. In this way, distributed storage of the data output by the container is implemented. This can reduce the difficulty in developing the distributed storage system, improve the efficiency of developing the distributed storage system, and reduce the memory consumption in the data distributed storage process while effectively ensuring the data transmission efficiency.

With respect to the apparatus in the above embodiments, the specific manner in which each module performs an operation has been described in detail in the embodiments relating to the method, and will not be detailed herein.

Figure 11:
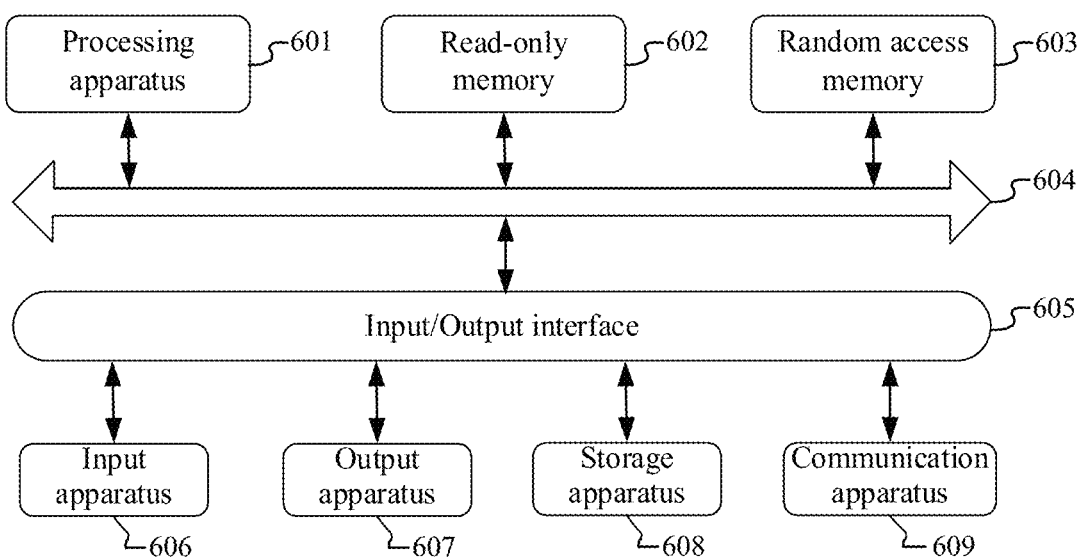
FIG. 11 is a block diagram of an electronic device according to an exemplary embodiment of the present disclosure.

Reference is made to FIG. 11 below, which is a schematic diagram of a structure of an electronic device 600 suitable for implementing the embodiments of the present disclosure. The electronic device in this embodiment of the present disclosure may include, but is not limited to, mobile terminals such as a mobile phone, a notebook computer, a digital broadcast receiver, a personal digital assistant (PDA), a tablet computer (PAD), a portable multimedia player (PMP), and a vehicle-mounted terminal (such as a vehicle navigation terminal), and fixed terminals such as a digital TV and a desktop computer. The electronic device shown in FIG. 11 is merely an example, and shall not impose any limitation on the function and scope of use of the embodiments of the present disclosure.

As shown in FIG. 11, the electronic device 600 may include a processing apparatus (e.g., a central processing unit, a graphics processing unit, etc.) 601 that may perform a variety of appropriate actions and processing in accordance with a program stored in a read-only memory (ROM) 602 or a program loaded from a storage apparatus 608 into a random access memory (RAM) 603. The RAM 603 further stores various programs and data required for the operation of the electronic device 600. The processing apparatus 601, the ROM 602, and the RAM 603 are connected to each other through a bus 604. An input/output (I/O) interface 605 is also connected to the bus 604.

Generally, the following apparatuses may be connected to the I/O interface 605: an input apparatus 606 including, for example, a touch screen, a touchpad, a keyboard, a mouse, a camera, a microphone, an accelerometer, and a gyroscope; an output apparatus 607 including, for example, a liquid crystal display (LCD), a speaker, and a vibrator; the storage apparatus 608 including, for example, a tape and a hard disk; and a communication apparatus 609. The communication apparatus 609 may allow the electronic device 600 to perform wireless or wired communication with other devices to exchange data. Although FIG. 11 shows the electronic device 600 having various apparatuses, it should be understood that it is not required to implement or have all of the shown apparatuses. It may be an alternative to implement or have more or fewer apparatuses.

In particular, according to an embodiment of the present disclosure, the process described above with reference to the flowchart may be implemented as a computer software program. For example, this embodiment of the present disclosure includes a computer program product, which includes a computer program carried on a non-transitory computer-readable medium, where the computer program includes program code for performing the methods shown in the flowcharts. In such an embodiment, the computer program may be downloaded from a network through the communication apparatus 609 and installed, installed from the storage apparatus 608, or installed from the ROM 602. When the computer program is executed by the processing apparatus 601, the above functions defined in the method of the embodiment of the present disclosure are performed.

It should be noted that the above computer-readable medium described in the present disclosure may be a computer-readable signal medium, a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium containing or storing a program which may be used by or in combination with an instruction execution system, apparatus, or device. In the present disclosure, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), etc., or any suitable combination thereof.

In some implementations, a client and a server may communicate using any currently known or future-developed network protocol such as a HyperText Transfer Protocol (HTTP), and may be connected to digital data communication (for example, a communication network) in any form or medium. Examples of the communication network include a local area network ("LAN"), a wide area network ("WAN"), an internetwork (for example, the Internet), a peer-to-peer network (for example, an ad hoc peer-to-peer network), and any currently known or future-developed network.

The above non-transitory computer-readable medium may be contained in the above electronic device. Alternatively, the non-transitory computer-readable medium may exist independently, without being assembled into the electronic device.

The above non-transitory computer-readable medium carries one or more programs that, when executed by the electronic device, cause the electronic device to:

when data to be stored that is sent by a container is received through a target interface, generate a first buffer in storage space of a kernel, and store in the first buffer the data to be stored;

obtain a target length, in the first buffer, of the data to be stored and a start address, in the first buffer, of the data to be stored;

determine, based on the target length and the start address, a target physical address in the kernel corresponding to the data to be stored, and generate a target page table based on the target physical address and a target virtual address in a storage service module, where the target page table includes a mapping relationship between the target physical address and the target virtual address; and transmit the data to be stored to the storage service module based on the target virtual address and the target length.

The computer program code for performing the operations of the present disclosure may be written in one or more programming languages or a combination thereof, where the programming languages include, but are not limited to, an object-oriented programming language, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the case of the remote computer, the remote computer may be connected to the computer of the user through any kind of network, including a local area network (LAN) or a wide area network (WAN), or may be connected to an external computer (for example, connected through the Internet with the aid of an Internet service provider).

The flowcharts and block diagrams in the accompanying drawings illustrate the possibly implemented architectures, functions, and operations of the system, the method, and the computer program product according to various embodiments of the present disclosure. In this regard, each block in the flowchart or block diagram may represent a module, program segment, or part of code, and the module, program segment, or part of code contains one or more executable instructions for implementing the specified logical functions. It should also be noted that, in some alternative implementations, the functions marked in the blocks may also occur in an order different from that marked in the accompanying drawings. For example, two blocks shown in succession can actually be performed substantially in parallel, or they can sometimes be performed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The modules described in the embodiments of the present disclosure may be implemented by means of software, or may be implemented by means of hardware. The name of a module does not impose any limitation on the module in a specific case. For example, a first obtaining module may also be described as "obtaining the target length, in the first buffer, of the data to be stored and the start address, in the first buffer, of the data to be stored".

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system-on-chip (SOC), a complex programmable logic device (CPLD), and the like.

In the context of the present disclosure, a machine-readable medium may be a tangible medium that may contain or store a program used by or in combination with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination thereof. A more specific example of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

According to one or more embodiments of the present disclosure, Example 1 provides a data storage method, applied to a distributed storage system. The distributed storage system includes a container, a kernel, and a user-mode storage service module. The storage service module is configured to provide a storage service for the container. The method includes:
- when data to be stored that is sent by the container is received through a target interface, generating a first buffer in storage space of the kernel, and storing in the first buffer the data to be stored;
- obtaining a target length, in the first buffer, of the data to be stored and a start address, in the first buffer, of the data to be stored;
- determining, based on the target length and the start address, a target physical address in the kernel corresponding to the data to be stored, and generating a target page table based on the target physical address and a target virtual address in the storage service module, where the target page table includes a mapping relationship between the target physical address and the target virtual address; and
- transmitting the data to be stored to the storage service module based on the target virtual address and the target length.

According to one or more embodiments of the present disclosure, Example 2 provides the data storage method according to Example 1. The transmitting the data to be stored to the storage service module based on the target virtual address and the target length includes:
- generating a target descriptor based on the target virtual address and the target length; and
- delivering the target descriptor to the storage service module based on the target descriptor through a virt-queue mechanism, so that the storage service module obtains, through the target descriptor, the data to be stored, and performs a storage operation on the data to be stored.

According to one or more embodiments of the present disclosure, Example 3 provides the data storage method according to Example 2. The determining, based on the target length and the start address, a target physical address in the kernel corresponding to the data to be stored includes:
- when it is determined, based on the target length and the start address, that the data to be stored is stored in the first buffer in a non-page-aligned manner, obtaining first partial data stored in the non-page-aligned manner in the data to be stored, and storing the first partial data in a bounce buffer that is pre-allocated;
- obtaining a first physical address corresponding to the bounce buffer and a second physical address corresponding to second partial data other than the first partial data in the data to be stored; and
- determining the first physical address and the second physical address as the target physical address.

According to one or more embodiments of the present disclosure, Example 4 provides the data storage method according to Example 3. The generating a target page table based on the target physical address and a target virtual address in the storage service module includes:
- determining a first virtual address in the storage service module based on the first physical address, and determining a second virtual address in the storage service module based on the second physical address; and
- establishing a first mapping relationship between the first physical address and the first virtual address, and establishing a second mapping relationship between the second physical address and the second virtual address, to generate a target page table including the first mapping relationship and the second mapping relationship.

According to one or more embodiments of the present disclosure, Example 5 provides the data storage method according to Example 4. The generating a target descriptor based on the target virtual address and the target length includes:
- when it is determined, based on the target length and the start address, that the data to be stored is stored in the first buffer in the non-page-aligned manner, obtaining a first length of the first partial data and a second length of the second partial data; and
- generating a target descriptor including the first virtual address, the first length, the second virtual address, and the second length.

According to one or more embodiments of the present disclosure, Example 6 provides the data storage method according to Example 3. The method further includes:
- obtaining a first ratio of the target length to a page size; and
- when the first ratio is an integer, determining a second ratio of the start address to the page size, and if the second ratio is not an integer, determining that the data to be stored is stored in the first buffer in the non-page-aligned manner; or
- when the first ratio is not an integer, determining that the data to be stored is stored in the first buffer in the non-page-aligned manner.

According to one or more embodiments of the present disclosure, Example 7 provides the data storage method according to any one of Examples 1 to 6. The kernel includes a virtio-blk device driver. Before the data to be stored that is sent by the container is received through the target interface, the method further includes:
- receiving a virtio-blk virtual device creation instruction sent by the storage service module, where the virtio-blk virtual device creation instruction includes a target device parameter required for creating a virtio-blk virtual device;
- generating the virtio-blk virtual device based on the target device parameter; and
- when it is determined that there is the virtio-blk virtual device in the kernel, executing the virtio-blk device driver in response to receiving a block device program creation instruction sent by the storage service module, to generate a virtual block device program, where the virtual block device program includes the target interface exposed to the container.

According to one or more embodiments of the present disclosure, Example 8 provides a data storage apparatus, applied to a distributed storage system. The distributed storage system includes a container, a kernel, and a user-mode storage service module. The storage service module is configured to provide a storage service for the container. The apparatus includes:

a first receiving module configured to: when data to be stored that is sent by the container is received through a target interface, generate a first buffer in storage space of the kernel, and store in the first buffer the data to be stored;

a first obtaining module configured to obtain a target length, in the first buffer, of the data to be stored and a start address, in the first buffer, of the data to be stored;

a first determining module configured to determine, based on the target length and the start address, a target physical address in the kernel corresponding to the data to be stored, and generate a target page table based on the target physical address and a target virtual address in the storage service module, where the target page table includes a mapping relationship between the target physical address and the target virtual address; and a transmission module configured to transmit the data to be stored to the storage service module based on the target virtual address and the target length.

According to one or more embodiments of the present disclosure, Example 9 provides the data storage apparatus according to Example 8. The transmission module is configured to:

generate a target descriptor based on the target virtual address and the target length; and deliver the target descriptor to the storage service module based on the target descriptor through a virtqueue mechanism, so that the storage service module obtains, through the target descriptor, the data to be stored, and performs a storage operation on the data to be stored.

According to one or more embodiments of the present disclosure, Example 10 provides the data storage apparatus according to Example 9. The first determining module is configured to:

when it is determined, based on the target length and the start address, that the data to be stored is stored in the first buffer in a non-page-aligned manner, obtain first partial data stored in the non-page-aligned manner in the data to be stored, and store the first partial data in a bounce buffer that is pre-allocated;

obtain a first physical address corresponding to the bounce buffer and a second physical address corresponding to second partial data other than the first partial data in the data to be stored; and determine the first physical address and the second physical address as the target physical address.

According to one or more embodiments of the present disclosure, Example 11 provides the data storage apparatus according to Example 10. The first determining module is configured to:

determine a first virtual address in the storage service module based on the first physical address, and determine a second virtual address in the storage service module based on the second physical address; and establish a first mapping relationship between the first physical address and the first virtual address, and establish a second mapping relationship between the second physical address and the second virtual address, to generate a target page table including the first mapping relationship and the second mapping relationship.

According to one or more embodiments of the present disclosure, Example 12 provides the data storage apparatus according to Example 11. The transmission module is configured to:

when it is determined, based on the target length and the start address, that the data to be stored is stored in the first buffer in the non-page-aligned manner, obtain a first length of the first partial data and a second length of the second partial data; and generate a target descriptor including the first virtual address, the first length, the second virtual address, and the second length.

According to one or more embodiments of the present disclosure, Example 13 provides the data storage apparatus according to Example 10. The apparatus further includes:

a second obtaining module configured to obtain a first ratio of the target length to a page size; and a second determining module configured to: when the first ratio is an integer, determine a second ratio of the start address to the page size, and if the second ratio is not an integer, determine that the data to be stored is stored in the first buffer in the non-page-aligned manner.

The second determining module is further configured to: when the first ratio is not an integer, determine that the data to be stored is stored in the first buffer in the non-page-aligned manner.

According to one or more embodiments of the present disclosure, Example 14 provides the data storage apparatus according to any one of Examples 8 to 13. The kernel includes a virtio-blk device driver. Before the data to be stored that is sent by the container is received through the target interface, the apparatus further includes:

a second receiving module configured to receive a virtio-blk virtual device creation instruction sent by the storage service module, where the virtio-blk virtual device creation instruction includes a target device parameter required for creating a virtio-blk virtual device;

a first generation module configured to generate the virtio-blk virtual device based on the target device parameter; and a second generation module configured to: when it is determined that there is the virtio-blk virtual device in the kernel, execute the virtio-blk device driver in response to receiving a block device program creation instruction sent by the storage service module, to generate a virtual block device program, where the virtual block device program includes the target interface exposed to the container.

According to one or more embodiments of the present disclosure, Example 15 provides a non-transitory computer-readable medium having a computer program stored thereon. When the program is executed by a processing apparatus, the steps of the method according to any one of Examples 1 to 7 are implemented.

According to one or more embodiments of the present disclosure, Example 16 provides an electronic device, including:

a storage apparatus having one or more computer programs stored thereon; and one or more processing apparatuses configured to execute the one or more computer programs in the storage apparatus to implement the steps of the method according to any one of Examples 1 to 7.

The above descriptions are merely preferred embodiments of the present disclosure and explanations of the applied technical principles. Those skilled in the art should understand that the scope of disclosure involved in the present disclosure is not limited to the technical solutions formed by specific combinations of the above technical features, and shall also cover other technical solutions formed by any combination of the above technical features or equivalent features thereof without departing from the above concept of disclosure. For example, a technical solution formed by a replacement of the above features with technical features with similar functions disclosed in the present disclosure (but not limited thereto) also falls within the scope of the present disclosure.

In addition, although the various operations are depicted in a specific order, it should not be understood as requiring these operations to be performed in the specific order shown or in a sequential order. Under specific circumstances, multitasking and parallel processing may be advantageous. Similarly, although several specific implementation details are included in the above discussions, these details should not be construed as limiting the scope of the present disclosure. Some features that are described in the context of separate embodiments can also be implemented in combination in a single embodiment. In contrast, various features described in the context of a single embodiment may alternatively be implemented in a plurality of embodiments individually or in any suitable subcombination.

Although the subject matter has been described in a language specific to structural features and/or logical actions of the method, it should be understood that the subject matter defined in the appended claims is not necessarily limited to the specific features or actions described above. In contrast, the specific features and actions described above are merely exemplary forms of implementing the claims. With respect to the apparatus in the above embodiments, the specific manner in which each module performs an operation has been described in detail in the embodiments relating to the method, and will not be detailed herein.

The invention claimed is:

1. A data storage method, applied to a distributed storage system, wherein the distributed storage system comprises a container, a kernel, and a user-mode storage service module, the storage service module is configured to provide a storage service for the container, and the method comprises:
   when data to be stored that is sent by the container is received through a target interface, generating a first buffer in storage space of the kernel, and storing in the first buffer the data to be stored;
   obtaining a target length, in the first buffer, of the data to be stored and a start address, in the first buffer, of the data to be stored;
   determining, based on the target length and the start address, a target physical address in the kernel corresponding to the data to be stored, and generating a target page table based on the target physical address and a target virtual address in the storage service module, wherein the target page table comprises a mapping relationship between the target physical address and the target virtual address; and
   transmitting the data to be stored to the storage service module based on the target virtual address and the target length.

2. The method according to claim 1, wherein the transmitting the data to be stored to the storage service module based on the target virtual address and the target length comprises:
   generating a target descriptor based on the target virtual address and the target length; and
   delivering the target descriptor to the storage service module based on the target descriptor through a virt-queue mechanism, so that the storage service module obtains, through the target descriptor, the data to be stored, and performs a storage operation on the data to be stored.

3. The method according to claim 2, wherein the determining, based on the target length and the start address, a target physical address in the kernel corresponding to the data to be stored comprises:
   when it is determined, based on the target length and the start address, that the data to be stored is stored in the first buffer in a non-page-aligned manner, obtaining first partial data stored in the non-page-aligned manner in the data to be stored, and storing the first partial data in a bounce buffer that is pre-allocated;
   obtaining a first physical address corresponding to the bounce buffer and a second physical address corresponding to second partial data other than the first partial data in the data to be stored; and
   determining the first physical address and the second physical address as the target physical address.

4. The method according to claim 3, wherein the generating a target page table based on the target physical address and a target virtual address in the storage service module comprises:
   determining a first virtual address in the storage service module based on the first physical address, and determining a second virtual address in the storage service module based on the second physical address; and
   establishing a first mapping relationship between the first physical address and the first virtual address, and establishing a second mapping relationship between the second physical address and the second virtual address, to generate a target page table comprising the first mapping relationship and the second mapping relationship.

5. The method according to claim 4, wherein the kernel comprises a virtio-blk device driver, and before the data to be stored that is sent by the container is received through the target interface, the method further comprises:
   receiving a virtio-blk virtual device creation instruction sent by the storage service module, wherein the virtio-blk virtual device creation instruction comprises a target device parameter required for creating a virtio-blk virtual device;
   generating the virtio-blk virtual device based on the target device parameter; and
   when it is determined that there is the virtio-blk virtual device in the kernel, executing the virtio-blk device driver in response to receiving a block device program creation instruction sent by the storage service module, to generate a virtual block device program, wherein the virtual block device program comprises the target interface exposed to the container.

6. The method according to claim 4, wherein the generating a target descriptor based on the target virtual address and the target length comprises:
   when it is determined, based on the target length and the start address, that the data to be stored is stored in the first buffer in the non-page-aligned manner, obtaining a first length of the first partial data and a second length of the second partial data; and
   generating a target descriptor comprising the first virtual address, the first length, the second virtual address, and the second length.

7. The method according to claim 6, wherein the kernel comprises a virtio-blk device driver, and before the data to be stored that is sent by the container is received through the target interface, the method further comprises:
- receiving a virtio-blk virtual device creation instruction sent by the storage service module, wherein the virtio-blk virtual device creation instruction comprises a target device parameter required for creating a virtio-blk virtual device;
- generating the virtio-blk virtual device based on the target device parameter; and
- when it is determined that there is the virtio-blk virtual device in the kernel, executing the virtio-blk device driver in response to receiving a block device program creation instruction sent by the storage service module, to generate a virtual block device program, wherein the virtual block device program comprises the target interface exposed to the container.

8. The method according to claim 3, further comprising:
- obtaining a first ratio of the target length to a page size; and
- when the first ratio is an integer, determining a second ratio of the start address to the page size, and if the second ratio is not an integer, determining that the data to be stored is stored in the first buffer in the non-page-aligned manner; or
- when the first ratio is not an integer, determining that the data to be stored is stored in the first buffer in the non-page-aligned manner.

9. The method according to claim 3, wherein the kernel comprises a virtio-blk device driver, and before the data to be stored that is sent by the container is received through the target interface, the method further comprises:
- receiving a virtio-blk virtual device creation instruction sent by the storage service module, wherein the virtio-blk virtual device creation instruction comprises a target device parameter required for creating a virtio-blk virtual device;
- generating the virtio-blk virtual device based on the target device parameter; and
- when it is determined that there is the virtio-blk virtual device in the kernel, executing the virtio-blk device driver in response to receiving a block device program creation instruction sent by the storage service module, to generate a virtual block device program, wherein the virtual block device program comprises the target interface exposed to the container.

10. The method according to claim 8, wherein the kernel comprises a virtio-blk device driver, and before the data to be stored that is sent by the container is received through the target interface, the method further comprises:
- receiving a virtio-blk virtual device creation instruction sent by the storage service module, wherein the virtio-blk virtual device creation instruction comprises a target device parameter required for creating a virtio-blk virtual device;
- generating the virtio-blk virtual device based on the target device parameter; and
- when it is determined that there is the virtio-blk virtual device in the kernel, executing the virtio-blk device driver in response to receiving a block device program creation instruction sent by the storage service module, to generate a virtual block device program, wherein the virtual block device program comprises the target interface exposed to the container.

11. The method according to claim 2, wherein the kernel comprises a virtio-blk device driver, and before the data to be stored that is sent by the container is received through the target interface, the method further comprises:
- receiving a virtio-blk virtual device creation instruction sent by the storage service module, wherein the virtio-blk virtual device creation instruction comprises a target device parameter required for creating a virtio-blk virtual device;
- generating the virtio-blk virtual device based on the target device parameter; and
- when it is determined that there is the virtio-blk virtual device in the kernel, executing the virtio-blk device driver in response to receiving a block device program creation instruction sent by the storage service module, to generate a virtual block device program, wherein the virtual block device program comprises the target interface exposed to the container.

12. The method according to claim 1, wherein the kernel comprises a virtio-blk device driver, and before the data to be stored that is sent by the container is received through the target interface, the method further comprises:
- receiving a virtio-blk virtual device creation instruction sent by the storage service module, wherein the virtio-blk virtual device creation instruction comprises a target device parameter required for creating a virtio-blk virtual device;
- generating the virtio-blk virtual device based on the target device parameter; and
- when it is determined that there is the virtio-blk virtual device in the kernel, executing the virtio-blk device driver in response to receiving a block device program creation instruction sent by the storage service module, to generate a virtual block device program, wherein the virtual block device program comprises the target interface exposed to the container.

13. A non-transitory computer-readable medium having a computer program stored thereon, wherein when the program is executed by a processing apparatus, the method according to claim 1 is implemented.

14. A data storage apparatus, applied to a distributed storage system, wherein the distributed storage system comprises a container, a kernel, and a user-mode storage service module, the storage service module is configured to provide a storage service for the container, and the apparatus comprises:
- a first receiving module configured to: when data to be stored that is sent by the container is received through a target interface, generate a first buffer in storage space of the kernel, and store in the first buffer the data to be stored;
- a first obtaining module configured to obtain a target length, in the first buffer, of the data to be stored and a start address, in the first buffer, of the data to be stored;
- a first determining module configured to determine, based on the target length and the start address, a target physical address in the kernel corresponding to the data to be stored, and generate a target page table based on the target physical address and a target virtual address in the storage service module, wherein the target page table comprises a mapping relationship between the target physical address and the target virtual address; and
- a transmission module configured to transmit the data to be stored to the storage service module based on the target virtual address and the target length.

15. An electronic device, comprising:
- a storage apparatus having one or more computer programs stored thereon; and one or more processing apparatuses configured to execute the one or more computer programs in the storage apparatus to implement a data storage method, applied to a distributed storage system, wherein the distributed storage system comprises a container, a kernel, and a user-mode storage service module, the storage service module is configured to provide a storage service for the container, and the method comprises:

when data to be stored that is sent by the container is received through a target interface, generating a first buffer in storage space of the kernel, and storing in the first buffer the data to be stored;

obtaining a target length, in the first buffer, of the data to be stored and a start address, in the first buffer, of the data to be stored;

determining, based on the target length and the start address, a target physical address in the kernel corresponding to the data to be stored, and generating a target page table based on the target physical address and a target virtual address in the storage service module, wherein the target page table comprises a mapping relationship between the target physical address and the target virtual address; and transmitting the data to be stored to the storage service module based on the target virtual address and the target length.

16. The electronic device according to claim 15, wherein the transmitting the data to be stored to the storage service module based on the target virtual address and the target length comprises:

generating a target descriptor based on the target virtual address and the target length; and delivering the target descriptor to the storage service module based on the target descriptor through a virtqueue mechanism, so that the storage service module obtains, through the target descriptor, the data to be stored, and performs a storage operation on the data to be stored.

17. The electronic device according to claim 16, wherein the determining, based on the target length and the start address, a target physical address in the kernel corresponding to the data to be stored comprises:

when it is determined, based on the target length and the start address, that the data to be stored is stored in the first buffer in a non-page-aligned manner, obtaining first partial data stored in the non-page-aligned manner in the data to be stored, and storing the first partial data in a bounce buffer that is pre-allocated;

obtaining a first physical address corresponding to the bounce buffer and a second physical address corresponding to second partial data other than the first partial data in the data to be stored; and determining the first physical address and the second physical address as the target physical address.

18. The electronic device according to claim 17, the generating a target page table based on the target physical address and a target virtual address in the storage service module comprises:

determining a first virtual address in the storage service module based on the first physical address, and determining a second virtual address in the storage service module based on the second physical address; and establishing a first mapping relationship between the first physical address and the first virtual address, and establishing a second mapping relationship between the second physical address and the second virtual address, to generate a target page table comprising the first mapping relationship and the second mapping relationship.

19. The electronic device according to claim 18, wherein the generating a target descriptor based on the target virtual address and the target length comprises:

when it is determined, based on the target length and the start address, that the data to be stored is stored in the first buffer in the non-page-aligned manner, obtaining a first length of the first partial data and a second length of the second partial data; and generating a target descriptor comprising the first virtual address, the first length, the second virtual address, and the second length.

20. The electronic device according to claim 17, wherein the data storage method further comprises:

obtaining a first ratio of the target length to a page size; and when the first ratio is an integer, determining a second ratio of the start address to the page size, and if the second ratio is not an integer, determining that the data to be stored is stored in the first buffer in the non-page-aligned manner; or when the first ratio is not an integer, determining that the data to be stored is stored in the first buffer in the non-page-aligned manner.

* * * * *